(12) United States Patent
Arora et al.

(10) Patent No.: US 7,112,389 B1
(45) Date of Patent: Sep. 26, 2006

(54) BATTERIES INCLUDING IMPROVED FINE FIBER SEPARATORS

(75) Inventors: Pankaj Arora, Chesterfield, VA (US); Simon Frisk, Richmond, VA (US); Lu Zhang, Midlothian, VA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/240,749

(22) Filed: Sep. 30, 2005

(51) Int. Cl.
*H01M 4/26* (2006.01)
*H01G 9/00* (2006.01)

(52) U.S. Cl. ............... 429/128; 429/120; 429/142; 429/176; 429/248; 429/249; 361/502; 361/504; 361/508; 361/512

(58) Field of Classification Search ........ 361/502–504, 361/508–512, 523–534; 429/248–249, 120, 429/142, 176
See application file for complete search history.

(56) References Cited

U.S. PATENT DOCUMENTS

| 4,746,586 A | | 5/1988 | Mizutani et al. |
| 5,902,696 A | * | 5/1999 | Smesko et al. ............. 429/142 |
| 6,051,335 A | * | 4/2000 | Dinh-Sybeldon et al. ... 429/142 |
| 6,444,367 B1 | * | 9/2002 | Kinn et al. .................. 429/250 |
| 6,594,139 B1 | * | 7/2003 | Muffoletto et al. ......... 361/509 |
| 6,905,798 B1 | * | 6/2005 | Tsukuda et al. ............ 429/249 |
| 2005/0063840 A1 | | 3/2005 | Jo et al. |

FOREIGN PATENT DOCUMENTS

| WO | WO 99/53555 A1 | 10/1999 |
| WO | WO 01/89022 A1 | 11/2001 |
| WO | WO 03/080905 A1 | 10/2003 |

OTHER PUBLICATIONS

U.S. Appl. No. 11/240,738, filed Sep. 30, 2005, Arora et al.

* cited by examiner

*Primary Examiner*—Nguyen T. Ha

(57) ABSTRACT

Alkaline and lithium batteries are disclosed that advantageously include separators comprising at least one porous layer of fine fibers having a diameter of between about 50 nm and about 3000 nm that provide improved combinations of reduced thickness, dendritic barrier against short-circuiting and low ionic resistance as compared with known battery separators.

25 Claims, No Drawings

BATTERIES INCLUDING IMPROVED FINE FIBER SEPARATORS

FIELD OF THE INVENTION

The present invention relates to the field of batteries, including lithium batteries and alkaline batteries, which include separators comprising a porous layer of polymeric fine fibers.

BACKGROUND

Batteries include separators positioned between the anode and the cathode in order to prevent an electrical connection between the anode and the cathode, or a short-circuit. A short-circuit develops when conductive particulates bridge the separator or the separator deteriorates to the point where it allows the electrodes to touch. Rarely does a battery short-circuit occur all at once but rather over time by the building up of very small conductance paths termed "soft shorts." "Dendrite shorting" refers to the situation where a dendrite comprising deposits, e.g., zincates in the case of alkaline batteries or lithium metal in the case of lithium batteries, form on one electrode of the battery and grow through the separator to the other electrode, resulting in an electrical connection between the anode and cathode.

Primary alkaline batteries generally have a cathode, an anode, a separator disposed between the cathode and the anode and an alkaline electrolyte solution. The cathode is typically formed of $MnO_2$, carbon particles and a binder. The anode can be formed of a gel including zinc particles. The electrolyte solution, which is dispersed throughout the battery, is most commonly an aqueous solution containing 30–40% potassium hydroxide. Battery separators used in alkaline batteries have certain performance requirements. For instance, such separators need stability in the presence of strong alkaline electrolytes (e.g. 30–40% KOH). Lack of alkali chemical resistance can result in internal short circuiting between the electrodes due to loss of mechanical integrity. Good electrolyte absorption is also necessary, meaning the separator is sufficiently impregnated with the electrolyte solution necessary for the electrochemical reaction of the cell. Another requirement of the separator is to be a barrier to the growing dendrites of conductive zinc oxide formed by the electrochemical reaction in the cell, which can penetrate the separator and cause a short circuit. The separator also must allow the movement of ions between the electrodes, in other words the separator should exhibit low resistance to the flow of ions.

Secondary alkaline Zinc-$MnO_2$ batteries have similar anodes, cathodes and electrolytes as primary alkaline batteries. Certain additives (e.g. $Bi_2O_3$, $BaSO_4$, organic inhibitors, etc.) are often added to the anode and the cathode to improve the reversibility so that the battery can be recharged after having been discharged and to reduce zinc corrosion. During charge and discharge, some of the additives can dissolve into the electrolyte and migrate to the other electrode. The use of a separator with good dendritic barrier properties will help extend the cycle life of Zinc-$MnO_2$ secondary batteries.

Battery separators for alkaline batteries are conventionally either thick, multi-layered nonwovens having large pores that have good (low) ionic resistance but relatively poor barrier to growing dendrites (also referred to herein as "dendritic barrier"), or multi-layered nonwovens with microporous membranes thereon having very small pores that have good dendritic barrier but very high ionic resistance. It would be desirable to have alkaline batteries with separators having improved balance of dendritic barrier and ionic resistance.

International Publication Number WO9953555 discloses a composite battery separator including at least one non-woven layer and a layer that reduces dendrite shorting, which may be a microporous layer of cellophane, polyvinyl alcohol, polysulfone, grafted polypropylene or polyamide. The thickness of the composite separator is about 8.3 mils thick. The battery separator has an ionic resistance of less than about 90 mohms-$cm^2$ when measured at 1 KHz in 40% potassium hydroxide (KOH) electrolyte solution. The microporous layer desirably has a very high level of barrier to air, but also undesirably a high ionic resistance, poor electrolyte wettability, and poor electrolyte absorption properties.

U.S. Pat. No. 4,746,586 discloses the use of PVA fibers having a denier of 0.8 or less to reduce the thickness and improve the barrier properties of battery separators for use in alkaline batteries, combined with cellulose fibers having a denier of no less than 1.0. If the cellulose fiber denier is reduced below this, the higher surface area fibers will lead to a higher rate of degradation.

Lithium batteries fall into three general categories, lithium primary batteries, lithium-ion secondary batteries and lithium-ion gel polymer batteries. Lithium primary batteries utilize many different types of battery chemistries, each using lithium as the anode, but differing in cathode materials and electrolytes. In the lithium manganese oxide or Li—$MnO_2$ cell, lithium is used as the anode and $MnO_2$ as the cathode material; the electrolyte contains lithium salts in a mixed organic solvent such as propylene carbonate and 1,2-dimethoxyethane. The lithium iron sulfide or Li/$FeS_2$ battery uses lithium as the anode, iron disulfide as the cathode, and lithium iodide in an organic solvent blend as the electrolyte. Lithium-ion secondary batteries use lithiated carbon as the anode, lithium metal oxide (e.g. $LiCoO_2$) as the cathode and a blend of organic solvents with 1 M lithium hexafluorophosphate ($LiPF_6$) as the electrolyte. Lithium-ion gel polymer batteries use similar anode and cathode materials as lithium-ion secondary batteries. The liquid organic electrolyte forms a gel with the polymeric separator, which helps provide a good bond between the separator and the electrodes. The ionic resistance of the gel electrolyte is higher than that of liquid electrolytes but the gel electrolyte provides some advantages in terms of safety and form factor (i.e., the ability to form a battery into different shapes and sizes).

International Publication Number WO0189022 discloses a super fine fibrous porous polymer separator film for use as a battery separator in a lithium secondary battery, the separator film having a thickness of 1 μm to 100 μm. The separator film is formed from fine fibers having a diameter of between 1 and 3000 nm made by electrospinning a polymeric melt or polymeric solution.

In recent years, due to the miniaturization of electronic equipment, batteries must be made smaller without sacrificing the performance of conventional batteries. Nonwoven materials conventionally used as separators in alkaline batteries have large diameter fibers, thus making it difficult to achieve thin separators. Such nonwovens also have large pores, e.g. between about 15 μm and about 35 μm. The particles of the anode and the cathode may migrate towards each other through the large pores to cause an internal short circuit. In order to compensate for the large pore size and improve the dendritic barrier of the separators, i.e., protection from short-circuiting, thicker separators are made by using multiple layers. The thicker separators result in higher ionic resistance which is undesirable from a battery performance point of view. Moreover, these types of thicker separators cannot be used in certain designs, especially coin cells and other small battery designs useful in electronic equipment. It would be desirable to have batteries having higher energy density; therefore it would be desirable to have thinner separators. However, if conventional separators are simply thinned, it may not provide sufficient dendritic barrier. It would be desirable to have a separator which can be made thin, having lower ionic resistance without sacrificing barrier properties.

SUMMARY OF THE INVENTION

According to one embodiment of the invention, the invention is directed to a battery having a separator comprising a porous fine fiber layer of polymeric fibers having a mean diameter in the range from about 50 nm to about 3000 nm, wherein the porous fine fiber layer has a mean flow pore size of between about 0.01 µm and about 15 µm, a thickness of between about 0.1 mils (0.0025 mm) and about 12 mils (0.3 mm), a porosity of between about 20% and about 90%, a basis weight of between about 1 g/m² and about 90 g/m², a Frazier air permeability of less than about 150 cfm/ft² (46 m³/min/m²) and a MacMullin number of between about 2 and about 15.

According to another embodiment of the invention, the invention is directed to an alkaline battery having a separator comprising a porous fine fiber layer of polymeric fibers having a mean diameter in the range from about 50 nm to about 3000 nm, wherein the fine fiber layer has a mean flow pore size of between about 0.01 µm and about 15 µm, a thickness of between about 0.1 mils (0.0025 mm) and about 12 mils (0.3 mm), a basis weight of between about 1 g/m² and about 90 g/m², a porosity of between about 20% and about 90%, a Frazier air permeability of less than about 150 cfm/ft² (46 m³/min/m²) and a MacMullin number of between about 2 and about 15.

According to another embodiment of the invention, the invention is directed to a lithium battery having a separator comprising a porous nanofiber layer of polymeric fibers having a mean diameter in the range from about 50 nm to about 1000 nm, wherein the nanofiber layer has a mean flow pore size of between about 0.01 µm and about 10 µm, a thickness of between about 0.1 mils (0.0025 mm) and about 5 mils (0.127 mm), a basis weight of between about 1 g/m² and about 30 g/m², a porosity of between about 20% and about 90%, a Frazier air permeability of less than about 50 cfm/ft² (15 m³/min/m²) and a MacMullin number of between about 2 and about 15.

DETAILED DESCRIPTION OF THE INVENTION

The batteries of the present invention include battery separators having an improved combination of reduced thickness, reduced ionic resistance and good dendritic barrier properties, providing a high resistance to short-circuiting. The separators useful in the batteries of the invention have a high capacity to absorb electrolyte while maintaining excellent structural integrity and chemical and dimensional stability in use, such that the separators do not lose their dendritic barrier properties even when saturated with electrolyte solution. The reduction in thickness enables the manufacture of batteries having increased capacity, since due to the thinner the separator, the lower the overall thickness of the materials used in a battery, i.e., anode, separator and cathode, more electrochemically active materials can be present in a given volume. The separators useful in the batteries of the invention have low ionic resistance, therefore ions flow easily between the anode and the cathode. This is evidenced by a MacMullin number of between about 2 and about 15.

The battery of the present invention includes a separator having at least one porous layer of fine polymeric fibers having a mean diameter in the range of between about 50 nm and about 3000 nm, even between about 50 nm and about 1000 nm, and even between about 50 nm and about 500 nm. Fine fibers in these ranges provide a separator structure with high surface area which results in good electrolyte absorption and retention due to increased electrolyte contact. The separator has a mean flow pore size of between about 0.01 µm and about 15 µm, even between about 0.01 µm and about 5 µm, and even between about 0.01 µm and about 1 µm. The separator has a porosity of between about 20% and about 90%, even between about 40% and about 70%. The high porosity of the separator also provides for good electrolyte absorption and retention in the battery of the invention.

A separator useful in the battery of the invention has a thickness of between about 0.1 mils (0.0025 mm) and about 12 mils (0.3 mm), even between about 0.5 mils (0.0127 mm) and about 5 mils (0.127 mm). The separator is thick enough to prevent dendrite-induced shorting between positive and negative electrode while allowing good flow of ions between the cathode and the anode. The thin separators create more space for the electrodes inside a cell and thus provide for improved performance and life of the batteries of the invention.

The separator has a basis weight of between about 1 g/m² and about 90 g/m², even between about 5 g/m² and about 30 g/m². If the basis weight of the separator is too high, i.e., above about 90 g/m², then the ionic resistance may be too high. If the basis weight is too low, i.e., below about 1 g/m², then the separator may not be able to reduce dendrite shorting between the positive and negative electrode.

The separator has a Frazier air permeability of less than about 150 cfm/ft² (46 m³/min/m²), even less than about 25 cfm/ft² (8 m³/min/m²), even less than about 5 cfm/ft² (1.5 m³/min/m²). In general, the higher the Frazier air permeability, the lower the ionic resistance of the separator, therefore a separator having a high Frazier air permeability is desirable. At low Frazier air permeability levels, i.e., about 1 cfm/ft² (0.30 m³/min/m²) and less, the air permeability of a sheet material is more accurately measured as Gurley Hill porosity, and is expressed in seconds/100 cc. The approximate relationship of Gurley Hill porosity to Frazier air permeability may be expressed as:

Gurley Hill porosity (in second)×Frazier (in cfm/ft²) =3.1

In general, the lower the Gurley Hill porosity, the lower the ionic resistance of the separator, therefore a separator having a low Gurley Hill porosity is desirable.

Polymers suitable for use in the separator include any thermoplastic and thermosetting polymers that are substantially inert to the electrolyte solution intended for use in the battery of the invention. Polymers suitable for use forming the fibers of the separator include, but are not limited to, polyvinyl alcohol, aliphatic polyamide, semi-aromatic polyamide, aromatic polyamide, polysulfone, cellulose acetate, cellulose, polyethylene terephthalate, polypropylene terephthalate, polybutylene terephthalate, polyvinylidene fluoride, polyvinylidene fluoride-hexafluoropropylene, polyethylene oxide, polymethyl pentene, polyacrylonitrile polyphenylene sulfide, polyacetyl, polyurethane, polyacrylonitrile, polymethyl methacrylate, polystyrene and copolymers or derivative compounds thereof, and combinations thereof.

In some embodiments of the invention, it is preferable to crosslink the polymer of the polymeric fine fibers in order to maintain the porous structure and improve the structural or mechanical integrity, thereby improving the dendritic barrier, and the thermal stability of separators made therefrom. Certain polymers, e.g. polyvinyl alcohol (PVA), polyvinylidene fluoride, polyvinylidene fluoride-hexafluoropropylene, polyethylene oxide, polyacrylonitrile, polymethyl methacrylate, tend to swell or gel in the electrolytes, thus closing the pores of the fibrous structure. In certain cases they will also become soft or degrade in the electrolyte leading to poor structural integrity. Depending on the polymer of the battery separator, various crosslinking agents and crosslinking conditions can be used. All the polymers mentioned above can be crosslinked by known means, such as by chemical crosslinking, electron beam crosslinking or UV crosslinking.

PVA can be crosslinked either by chemical crosslinking, electron beam crosslinking or UV crosslinking. Chemical crosslinking of a PVA fine fiber layer can be done by treating the PVA layer with a dialdehyde and an acid and subsequently neutralizing the acid with $NaHCO_3$ and washing the layer with water. Crosslinking of PVA makes it water insoluble, increases its mechanical strength and its oxidation and chemical resistance.

Polyvinylidene fluoride-hexafluoropropylene separators can be cross-linked by adding a crosslinking agent (PEGDMA oligomer) and an crosslinking initiator (2,2-azobisisobutyronitrile) and heating the separator at 80° C. for 12 hours. Polyacrylonitrile separators can be crosslinked by adding a crosslinking agent (e.g., ethylene glycol dimethacrylate, or triethylene glycol dimethacrylate) and an initiating agent (e.g., benzoyl peroxide) and heating at 60° C.

One embodiment of the invention relates to an alkaline battery. The battery can be an alkaline primary battery, e.g., Zinc-Manganese Oxide or Zn—$MnO_2$ battery in which the anode is zinc and the cathode is manganese oxide ($MnO_2$), or Zinc-Air battery in which the anode is zinc and the cathode is air, or it can be an alkaline secondary battery, e.g., a Nickel Cadmium battery in which the anode is cadmium and the cathode is Nickel oxy-hydroxide (NiOOH), Nickel Zinc or Ni—Zn battery in which the anode is zinc and the cathode is NiOOH, Nickel Metal Hydride (NiMH) battery in which the anode is metal hydride (e.g. $LaNi_5$) and the cathode is NiOOH or Nickel-Hydrogen or $NiH_2$ battery in which the anode is hydrogen ($H_2$) and the cathode is NiOOH. Other types of alkaline batteries include Zinc/Mercuric Oxide in which the anode is zinc, and the cathode is mercury oxide (HgO), Cadmium/Mercuric Oxide in which the anode is cadmium and the cathode is mercury oxide, Zinc/Silver Oxide in which the anode is zinc and the cathode is silver oxide (AgO), Cadmium/Silver Oxide in which the anode is cadmium and the cathode is silver oxide. All of these battery types use 30–40% potassium hydroxide as the electrolyte.

In this embodiment, the separator has good electrolyte absorption, low ionic resistance and good barrier properties capable of preventing internal shortage caused by zinc oxide dendrites. The alkaline battery of this embodiment of the invention includes a separator having an ionic resistance of less than about 100 milliohms-$cm^2$, advantageously between about 10 milliohms-$cm^2$ and about 60 milliohms-$cm^2$, as measured in 40% potassium hydroxide electrolyte solution at 1 KHz. The separator has a MacMullin number of between about 2 and about 15, advantageously between about 2 and about 6.

Suitable polymers for use in the alkaline battery separator include aliphatic polyamide, semi-aromatic polyamide, polyvinyl alcohol, cellulose, polyethylene terephthalate, polypropylene terephthalate, polybutylene terephthalate, polysulfone, polyvinylidene fluoride, polymethyl pentene, polyphenylene sulfide, polyacetyl, polyacrylonitrile, polyurethane, aromatic polyamide and blends, mixtures and copolymers thereof. Polymers that are especially suitable for use in the alkaline battery separator include polyvinyl alcohol, cellulose, aliphatic polyamide and polysulfone. As previously stated, in some embodiments of the invention, it may be preferable to crosslink the polymeric fine fibers in order to maintain the porous structure and improve the structural integrity of the separator in the electrolyte. For example, uncrosslinked polyvinyl alcohol separators can dissolve in water and form a gel type structure having poor structural integrity in strong alkaline electrolytes.

In some embodiments of the invention, it may be preferable to coat the separators with surfactants prior to forming into a battery in order to improve the wettability and wicking properties in 30–40% KOH electrolyte. Polyamides can be coated with a surfactant in order to wet with KOH electrolyte. The surfactant is one that is stable in a strong alkaline environment, such as an ionic surfactant. Alternatively, the separators can undergo grafting, plasma treatment or corona treatment to improve the wettability of separators.

Another embodiment of the invention relates to a lithium battery. The lithium battery of the invention can be a lithium primary battery, such as a Li—$MnO_2$ or a Li—$FeS_2$ lithium primary battery, a lithium ion secondary battery or a lithium ion gel polymer battery.

Lithium primary batteries utilize many different types of battery chemistries, each using lithium as the anode, but differing in cathode materials ($SO_2$, $SOCl_2$, $SO_2Cl_2$, $CF_n$, CuO, $FeS_2$, $MnO_2$ etc.) and electrolytes. In the lithium manganese oxide or Li—$MnO_2$ cell, lithium is used as the anode and $MnO_2$ as the cathode material; the electrolyte contains lithium salts in a mixed organic solvent such as propylene carbonate and 1,2-dimethoxyethane. The lithium iron sulfide or Li/$FeS_2$ battery uses lithium as the anode, iron disulfide as the cathode, and lithium iodide in an organic solvent blend (e.g., propylene carbonate, ethylene carbonate, dimethoxy ethane, etc.) as the electrolyte.

Lithium ion secondary batteries use lithiated carbon as the anode, lithium metal oxide (e.g., $LiCoO_2$, $LiNiO_2$, $LiMn_2O_4$, etc.) as the cathode and a blend of organic solvents (e.g., propylene carbonate, ethylene carbonate, diethyl carbonate, dimethyl carbonate, ethyl methyl carbonate, etc.) with 1 M lithium hexafluorophosphate ($LiPF_6$) as the electrolyte.

Lithium ion gel polymer batteries use similar anode and cathode as lithium ion secondary batteries. The liquid organic electrolyte forms a gel with the polymeric separator (e.g., PVdF, PVdF-HFP, PMMA, PAN, PEO, etc.), which helps in getting a good bond between the separator and electrodes. The ionic resistance of the gel electrolyte is higher then liquid electrolytes but provides additional advantages in terms of safety and form factor.

A separator useful in this embodiment has good electrolyte absorption, low ionic resistance and good barrier properties capable of preventing internal shortage caused by lithium metal dendrites. The lithium battery according to the invention includes a separator which has reduced thickness as compared with conventional separators, and exhibits good tensile strength, chemically stable in organic electrolytes, and dimensional stability in use. The lithium battery separator comprises a porous fine fiber (nanofiber) layer of fibers having a mean diameter in the range from about 50 nm to about 1000 nm, even between about 50 nm and about 500 nm. The term "nanofibers" as used herein refers to fibers having diameters varying from a few tens of nanometers up to several hundred nanometers, but generally less than one micrometer. The nanofiber layer has a mean flow pore size of between about 0.01 µm and about 10 µm, advantageously between about 0.01 µm and about 1 µm. The lithium battery separator has a thickness of between about 0.1 mils (0.0025 mm) and about 5 mils (0.127 mm), advantageously between about 0.1 (0.0025 mm) mils and about 3 mils (0.075 mm). The lithium battery separator has a basis weight of between about 1 $g/m^2$ and about 30 $g/m^2$, advantageously between about 5 $g/m^2$ and about 15 $g/m^2$. The lithium battery separator has a porosity of between about 20% and about 90%, even between about 40% and about 70%, and a Frazier air permeability of less than about 50 $cfm/ft^2$ (15 $m^3/min/m^2$), even less than about 5 $cfm/ft^2$ (1.5 $m^3/min/m^2$).

The lithium battery separator useful in this embodiment of the invention has an ionic resistance of less than about 10 ohms-$cm^2$ advantageously between about 1 ohms-$cm^2$ and about 5 ohms-$cm^2$, as measured in 0.5 molar lithium trifluoromethanesulfonate (LiTFS), propylene carbonate: ethylene carbonate: dimethoxyethane (22:8:70) electrolyte solution. The separator has a MacMullin number of between about 2 and about 15, advantageously between about 4 and about 10.

Polymers suitable for use in the lithium battery separator include aliphatic polyamide, polyvinyl alcohol, polyethylene terephthalate, polybutylene terephthalate, polysulfone, polyvinylidene fluoride, polyvinylidene fluoride-hexafluoropropylene, polymethyl pentene, polyphenylene sulfide, polyacetyl, polyurethane, aromatic polyamide, semi-aromatic polyamide, polypropylene terephthalate, polyacrylonitrile, polymethyl methacrylate, polystyrene, and blends, mixtures and copolymers thereof. Polymers that are especially suitable for use in the lithium battery separator include aliphatic polyamide, semi-aromatic polyamide, polyvinyl alcohol, polyethylene terephthalate, polypropylene terephthalate, polybutylene terephthalate, polyethylene oxide, polyvinylidene fluoride, polyvinylidene fluoride-hexafluoropropylene, polyphenylene sulfide, polyacylonitrile, polymethyl methacrylate, polyacetyl, and aromatic polyamide.

In this embodiment of the invention, it may be preferable to crosslink the polymeric fine fibers in order to maintain the porous structure and improve the mechanical integrity of the separator, as discussed above.

The process for making the fine fiber layer(s) of the separator for use in the battery of the invention is an electroblowing process as disclosed in International Publication Number WO2003/080905 (U.S. Ser. No. 10/822, 325), which is hereby incorporated by reference.

In one embodiment of the invention, the battery separator comprises a single fine fiber layer made by a single pass of a moving collection means through the process, i.e., in a single pass of the moving collection means under the spin pack. It will be appreciated that the fibrous web can be formed by one or more spinning beams running simultaneously over the same moving collection means.

The collected fine fiber layer(s) are advantageously bonded which has been found to improve the tensile strength of the separator. The high level of tensile strength in the machine direction helps during cell winding and also contributes to the good dendritic barrier of the separator in use. Bonding may be accomplished by known methods, including but not limited to thermal calendering between heated smooth nip rolls, ultrasonic bonding, point bonding, and through gas bonding. Bonding increases the strength of the fine fiber layer(s) so that the layer(s) may withstand the forces associated with being handled and being formed into a useful separator, and depending on the bonding method used, adjusts physical properties such as thickness, density, and the size and shape of the pores. As previously stated, the strength of the separator also results in good mechanical integrity in use in the battery. When thermal calendering is used, care must be taken not to over-bond the material, such that the fine fibers melt and no longer retain their structure as individual fibers. In the extreme, over-bonding would result in the fine fibers melting completely such that a film would be formed.

Separators useful in the batteries of the invention can comprise either a single layer of polymeric fine fibers or multiple layers. When the separator comprises multiple layers, the multiple layers can be layers of the same polymeric fine fibers, or can alternatively be layers of differing polymeric fine fibers. The multiple layers can have differing characteristics including, but not limited to, polymer, thickness, basis weight, pore size, fiber size, porosity, air permeability, ionic resistance and tensile strength.

TEST METHODS

Basis Weight was determined by ASTM D-3776, which is hereby incorporated by reference and reported in $g/m^2$.

Porosity was calculated by dividing the basis weight of the sample in $g/m^2$ by the polymer density in $g/cm^3$ and by the sample thickness in micrometers and multiplying by 100 and subsequently subtracting from 100%, i.e., percent porosity=100−basis weight/(density×thickness)×100.

Fiber Diameter was determined as follows. Ten scanning electron microscope (SEM) images at 5,000× magnification were taken of each fine fiber layer sample. The diameter of eleven (11) clearly distinguishable fine fibers were measured from the photographs and recorded. Defects were not included (i.e., lumps of fine fibers, polymer drops, intersections of fine fibers). The average (mean) fiber diameter for each sample was calculated.

Thickness was determined by ASTM D1777, which is hereby incorporated by reference, and is reported in mils and converted to micrometers.

Ionic Resistance in KOH electrolyte is a measure of a separator's resistance to the flow of ions, and was determined as follows. Samples were cut into small pieces (1"×1") and soaked in 40% potassium hydroxide overnight to ensure thorough wetting. Samples were sandwiched between two Teflon® shims with a 1 $cm^2$ window exposing the sample. The sandwich of Teflon® shims and sample was placed in a resistance cell having two platinum electrodes such that the window was facing the two electrodes. The resistance was measured at 1 KHz using an HP milliohmeter. The measurement was repeated without any separator between the Teflon® shims. The difference between the two readings is the resistance (milliohms) of the sample. The separator resistance is then multiplied by the area of the electrodes (1 $cm^2$ in this case) and the results are reported in milliohms-$cm^2$.

Ionic Resistance in Organic electrolyte is a measure of a separator's resistance to the flow of ions, and was determined as follows. Samples were cut into small pieces (0.75 in diameter) and soaked in 0.5 M lithium trifluoromethanesulfonate (LiTFS) in propylene carbonate:ethylene carbonate:dimethoxyethane (22:8:70) electrolyte. The separator resistance is measured using Solartron 1287 Electrochemical Interface along with Solartron 1252 Frequency Response Analyzer and the Zplot software. The test cell has a 0.29 square inch (1.875 square cm) electrode area that contacts the wetted separator. Measurements are done at an AC amplitude of 5 mV and the frequency range of 10 Hz to 100,000 Hz. The high frequency intercept in the Nyquist plot is the separator resistance (in ohms). The separator resistance (ohms) is multiplied with the electrode area (1.875 square cm) to determine ionic resistance in ohms-cm².

MacMullin Number (Nm) is a dimensionless number and is a measure of the ionic resistance of the separator, and is defined as the ratio of the resistivity of a separator sample filled with electrolyte to the resistivity of an equivalent volume of the electrolyte alone. It is expressed by:

$$Nm = (R_{separator} \times A_{electrode}) / (\rho_{electrolyte} \times t_{separator})$$

where $R_{separator}$ is the resistance of the separator in ohms, $A_{electrode}$ is the area of electrode in cm², $P_{electrolyte}$ is the resistivity of electrolyte in ohms-cm, $t_{separator}$ is the thickness of separator in cm. The resistivity of 40% KOH electrolyte at 25° C. is 2.22 ohms-cm and the resistivity of 0.5 M lithium trifluoromethanesulfonate (LiTFS) in propylene carbonate:ethylene carbonate:dimethoxyethane (22:8:70) electrolyte at 25° C. is 182 ohms-cm.

Frazier Air Permeability is a measure of air permeability of porous materials and is reported in units of ft³/min/ft². It measures the volume of air flow through a material at a differential pressure of 0.5 inches (12.7 mm) of the water. An orifice is mounted in a vacuum system to restrict flow of air through sample to a measurable amount. The size of the orifice depends on the porosity of the material. Frazier permeability is measured in units of ft³/min/ft² using a Sherman W. Frazier Co. dual manometer with calibrated orifice, and converted to units of m³/min/m².

Gurley Hill Porosity is the time required for a given volume of air (100 cubic centimeters) to pass through an area of material (one square inch) under a pressure of approximately 4.9 inches of water. Gurley Hill Porosity was determined by TAPPI T460/ASTM D726, which is hereby incorporated by reference and reported in seconds.

Mean Flow Pore Size was measured according to ASTM Designation E 1294-89, "Standard Test Method for Pore Size Characteristics of Membrane Filters Using Automated Liquid Porosimeter" which approximately measures pore size characteristics of membranes with a pore size diameter of 0.05 μm to 300 μm by using automated bubble point method from ASTM Designation F 316 using a capillary flow porosimeter (model number CFP-34RTF8A-3-6-L4, Porous Materials, Inc. (PMI), Ithaca, N.Y.). Individual samples (8, 20 or 30 mm diameter) were wetted with low surface tension fluid (1,1,2,3,3,3-hexafluoropropene, or "Galwick," having a surface tension of 16 dyne/cm). Each sample was placed in a holder, and a differential pressure of air was applied and the fluid removed from the sample. The differential pressure at which wet flow is equal to one-half the dry flow (flow without wetting solvent) is used to calculate the mean flow pore size using supplied software.

Tensile Strength was measured according to ASTM D5035-95, "Standard Test Method for Breaking Force and Elongation of Textile Fabrics (Strip Method)" and was reported in kg/cm².

EXAMPLES

Battery separators useful in batteries of the present invention will be described in more detail in the following examples. An electroblowing apparatus as described in International Publication Number WO2003/080905 was used to produce the fine fiber separators as described in the Examples below.

Examples 1–10

Layers of nanofibers were made by electroblowing a solution of DuPont Nylon 66-FE 3218 polymer having a density of 1.14 g/cm³ (available from E. I. du Pont de Nemours and Company, Wilmington, Del.) at 24 weight percent in formic acid (available from Kemira Oyj, Helsinki, Finland). A spin pack having spinning nozzles and gas injection nozzles was maintained at a temperature of between about 17° C. and about 26° C., and the pressure of the solution in the spinning nozzles at between about 9 bar and about 13 bar. The spinneret was electrically insulated and a voltage of 65 kV was applied across the spinneret. Compressed air at a temperature of between about 34° C. and about 79° C. was injected through the gas injection nozzles from the spin pack at a rate of about 4.7 m³/min to about 6 m³/min and a pressure of between 240 mm H₂O and about 410 mm H₂O. The fibers exited the spinning nozzles into air at atmospheric pressure, a relative humidity of between about 50% and about 72% and a temperature of between about 13° C. and about 24° C. The fibers were laid down the distance of between about 300 mm and about 360 mm below the exit of the pack onto a porous belt moving at a speed of about 5.7 m/min to about 14.7 m/min. A vacuum chamber beneath the porous belt assisted in the laydown of the fibers. The nanofiber layer samples were formed by depositing the fibers directly onto the moving collection belt, either in a single pass (forming a single nanofiber layer) or multiple passes (forming multiple nanofiber layers) of the moving collection belt under the spin pack, as specified below. The single nanofiber layers could not be pulled apart into more than one layer of nanofibers by ordinary means.

Example 1

A layer of nanofibers was made by electroblowing the solution through the spin pack at a temperature of 17° C. with the pressure of the solution in the spinning nozzles at 13 bar. Compressed air at a temperature of 34° C. was injected through the gas injection nozzles from the spin pack at a rate of 5 m³/min and a pressure of 240 mm H₂O. The fibers were laid down 300 mm below the exit of the pack onto a porous belt moving at 5.7 m/min. The nanofiber layer sample was made in a single pass of the moving collection belt beneath the spin pack without a scrim, by depositing the fibers directly onto the moving collection belt.

Example 2

A layer of nanofibers was made by electroblowing the solution as in Example 1 through the spin pack at a temperature of 24° C. with the pressure of the solution in the spinning nozzles at 11 bar. Compressed air at a temperature of 60° C. was injected through the gas injection nozzles from the spin pack at a rate of 5.5 m³/min and a pressure of 320 mm H₂O. The fibers were laid down 330 mm below the exit of the pack onto a porous belt moving at 7.4 m/min. The nanofiber layer sample was made in a single pass of the moving collection belt beneath the spin pack, without a scrim, by depositing the fibers directly onto the moving collection belt.

Example 3

A layer of nanofibers was made by electroblowing the solution as in Example 1 through the spin pack at a temperature of 22° C. with the pressure of the solution in the spinning nozzles at 10 bar. Compressed air at a temperature of 70° C. was injected through the gas injection nozzles from into the spin pack at a rate of 6 m$^3$/min and a pressure of 290 mm H$_2$O. The fibers were laid down 330 mm below the exit of the pack onto a porous belt moving at 7.4 m/min. The nanofiber layer sample was made in a single pass of the moving collection belt beneath the spin pack, without a scrim, by depositing the fibers directly onto the moving collection belt.

Example 4

Layers of nanofibers were made by electroblowing the solution as in Example 1 through the spin pack at a temperature of 20° C. with the pressure of the solution in the spinning nozzles at 12 bar. Compressed air at a temperature of 35° C. was injected through the gas injection nozzles from the spin pack at a rate of 5 m$^3$/min and a pressure of 260 mm H$_2$O. The fibers were laid down 300 mm below the exit of the pack onto a porous belt moving at 11.3 m/min. The nanofiber layer sample was made without a scrim, by depositing the fibers directly onto the moving collection belt, in three passes of the moving belt under the spin pack.

Example 5

Layers of nanofibers were made by electroblowing the solution as in Example 1 through the spin pack at a temperature of 26° C. with the pressure of the solution in the spinning nozzles at 11 bar. Compressed air at a temperature of 60° C. was injected through the gas injection nozzles from the spin pack at a rate of 5.5 m$^3$/min and a pressure of 400 mm H$_2$O. The fibers were laid down 330 mm below the exit of the pack onto a porous belt moving at 14.7 m/min. The nanofiber layer sample was made without a scrim, by depositing the fibers directly onto the moving collection belt, in three passes of the moving belt under the spin pack.

Example 6

Layers of nanofibers were made by electroblowing the solution as in Example 1 through the spin pack at a temperature of 21° C. with the pressure of the solution in the spinning nozzles at 10 bar. Compressed air at a temperature of 71° C. was injected through the gas injection nozzles from the spin pack at a rate of 5 m$^3$/min and a pressure of 410 mm H$_2$O. The fibers were laid down 330 mm below the exit of the pack onto a porous belt moving at 14.7 m/min. The nanofiber layer sample was made without a scrim, by depositing the fibers directly onto the moving collection belt, in three passes of the moving belt under the spin pack.

Example 7

Layers of nanofibers were made by electroblowing the solution as in Example 1 through the spin pack at a temperature of 20° C. with the pressure of the solution in the spinning nozzles at 13 bar. Compressed air at a temperature of 34° C. was injected through the gas injection nozzles from the spin pack at a rate of 5 m$^3$/min and a pressure of 280 mm H$_2$O. The fibers were laid down 300 mm below the exit of the pack onto a porous belt moving at 5.7 m/min. The nanofiber layer sample was made without a scrim, by depositing the fibers directly onto the moving collection belt, in four passes of the moving belt under the spin pack.

Example 8

Layers of nanofibers were made by electroblowing the solution as in Example 1 through the spin pack at a temperature of 26° C. with the pressure of the solution in the spinning nozzles at 12 bar. Compressed air at a temperature of 54° C. was injected through the gas injection nozzles from the spin pack at a rate of 5.7 m$^3$/min and a pressure of 360 mm H$_2$O. The fibers were laid down 330 mm below the exit of the pack onto a porous belt moving at 7.4 m/min. The nanofiber layer sample was made without a scrim, by depositing the fibers directly onto the moving collection belt, in four passes of the moving belt under the spin pack.

Example 9

Layers of nanofibers were made by electroblowing the solution as in Example 1 through the spin pack at a temperature of 13° C. with the pressure of the solution in the spinning nozzles at 9 bar. Compressed air at a temperature of 79° C. was injected through the gas injection nozzles from the spin pack at a rate of 5.5 m$^3$/min and a pressure of 360 mm H$_2$O. The fibers were laid down 360 mm below the exit of the pack onto a porous belt moving at 7.4 m/min. The nanofiber layer sample was made without a scrim, by depositing the fibers directly onto the moving collection belt, in four passes of the moving belt under the spin pack.

Example 10

Layers of nanofibers were made by electroblowing the solution as in Example 1 through the spin pack at a temperature of 23° C. with the pressure of the solution in the spinning nozzles at 13 bar. Compressed air at a temperature of 45° C. was injected through the gas injection nozzles from the spin pack at a rate of 5.5 m$^3$/min. The fibers were laid down 300 mm below the exit of the pack onto a porous belt moving at 5 m/min. The nanofiber layer sample was made without a scrim, by depositing the fibers directly onto the moving collection belt, in four passes of the moving belt under the spin pack. To illustrate the effects of bonding, the nanofiber layer sample of Example 10 was calendered using the conditions listed in Table 1.

TABLE 1

| Bonding Conditions | | | Thickness μm | Gurley Hill porosity sec | MD Tensile Strength kg$_f$/cm$^2$ |
|---|---|---|---|---|---|
| Temp. ° F. (° C.) | Press. pli (kg/cm) | Line Speed ft/min (m/min) | | | |
| Unbonded | | | 54 | 0.4 | 30 |
| 100 (38) | 500 (89) | 10 (3.0) | 31 | 0.6 | 79 |
| 100 (38) | 1000 (179) | 10 (3.0) | 30 | 1.1 | 87 |
| 100 (38) | 1500 (268) | 10 (3.0) | 27 | 1.5 | |
| 100 (38) | 2000 (357) | 10 (3.0) | 27 | 1.4 | 82 |
| 250 (120) | 500 (89) | 10 (3.0) | 27 | 1.1 | 100 |
| 250 (120) | 1000 (179) | 10 (3.0) | 24 | 3.7 | 122 |
| 250 (120) | 1500 (268) | 10 (3.0) | 30 | 5.0 | 93 |
| 250 (120) | 2000 (357) | 10 (3.0) | 28 | 7.0 | 100 |

As can be seen from Table 1, bonding the fine fiber layers resulted in reduced thickness and increased strength with some loss in air permeability. Battery separators thus bonded have greater density and greater dendritic barrier in use yet offer low resistance to flow of ions.

TABLE 2

| Ex. | Thickness mil (mm) | Basis Weight g/m² | Fiber Dia. nm | Frazier Air Permeability cfm/ft² (m³/min/m²) | MD Tensile Strength kg$_f$/cm² | Mean Flow Pore Size μm | Porosity % | Ionic Resistance* ohm-cm² | MacMullin No. |
|---|---|---|---|---|---|---|---|---|---|
| 1 | 1.53 (0.039) | 10.4 | 414 | 25.5 (7.77) | 18.2 | 3.97 | 76.6 | 1.92 | 2.7 |
| 2 | 1.58 (0.040) | 10.5 | 677 | 56.2 (17.1) | 24.8 | 6.70 | 77.2 | 2.51 | 3.5 |
| 3 | 1.37 (0.035) | 10.6 | 946 | 65.6 (20.0) | 35.1 | 7.25 | 73.3 | 2.64 | 4.2 |
| 4 | 3.60 (0.091) | 28.5 | 459 | 8.40 (2.56) | 25.2 | 2.65 | 72.7 | 3.96 | 2.4 |
| 5 | 3.80 (0.096) | 29.9 | 647 | 13.1 (3.99) | 35.1 | 4.17 | 72.8 | 5.31 | 3.1 |
| 6 | 3.55 (0.090) | 29.0 | 945 | 18.2 (5.55) | 37.8 | 4.98 | 71.8 | 4.51 | 2.8 |
| 7 | 5.97 (0.151) | 46.7 | 398 | 4.80 (1.46) | 27.8 | 2.48 | 73.0 | 8.32 | 3.0 |
| 8 | 6.25 (0.159) | 47.1 | 746 | 14.5 (4.42) | 29.7 | 4.28 | 74.0 | 6.82 | 2.4 |
| 9 | 6.34 (0.161) | 47.4 | 1026 | 16.7 (5.09) | 38.7 | 6.25 | 74.2 | 8.76 | 3.0 |
| 10 | 2.12 (0.054) | 14.7 | 430 | 11.8 (3.60) | 31.0 | 2.69 | 76.1 | | |

*as measured in 0.5 molar lithium trifluoromethanesulfonate (LiTFS), propylene carbonate: ethylene carbonate: dimethoxyethane (22:8:70) electrolyte solution.

The separators discussed in Examples 1–10 exhibit low ionic resistance and good dendritic barrier properties. The ionic resistance of the separators is reported as the Mac-Mullin number and depends on the thickness, and porosity of the separator. Good dendritic barrier is provided by the small pore size despite the low thickness, and is further evidenced by the superior tensile strengths of the fabrics. Separators with very fine fibers exhibit good barrier properties despite low thickness since a greater number of fibers can be packed in the same separator structure.

Example 11

Layers of nanofibers were made by electroblowing a solution of DuPont Elvanol® polyvinyl alcohol (PVA) polymer 80-18 having a density of 1.26 g/cm³ (available from E. I. du Pont de Nemours and Company, Wilmington, Del.) at 16 weight % in water, substantially as set forth in Example 1. The temperature of the solution in the pack was 42° C. with the pressure of the solution in the spinning nozzles at 2.5 bar. The spinneret was electrically insulated and applied with a voltage of 80 kV. Compressed air at a temperature of 60° C. was injected through the gas injection nozzles from the spin pack at a rate of 1000 L/min. The fibers were laid down 300 mm below the exit of the pack onto a porous belt moving at 1 m/min. A vacuum chamber beneath the porous belt assisted in the laydown of the fibers. The nanofiber layer sample was laid onto a scrim (a 30 g/m² PET spunbond fabric available from Kolon Industries, Inc., Korea) positioned on the porous belt in two passes of the moving collection belt beneath the spin pack. The nanofiber layer sample was passed through a dryer at 100° C.

The nanofiber layer sample was then removed from the scrim, and subjected to cross-linking as follows. A reaction liquid was prepared by mixing 20 ml of concentrated H₂SO₄, 200 g of Na₂SO₄ and 50 g of gluteraldehyde in 1000 g of water. A 8 inch by 14 inch sample of the nanofiber layer sample was immersed in the reaction liquid at a temperature of 80° C. for between 1 min and 2 min. The sample was then immersed in water for 5 min, then immersed in 0.1 M of NaHCO₃ for 5 min and then immersed in water for 10 min. The resulting sample was dried by removing water from the sample.

Example 12

Layers of nanofibers were made by electroblowing the solution at the same conditions as in Example 11, with the exceptions that the applied voltage was 76 kV and the line speed was 0.5 m/min. The nanofiber layer sample was laid onto a scrim (a 30 g/m² PET spunbond fabric available from Kolon Industries, Inc., Korea) positioned on the porous belt in two passes of the moving collection belt beneath the spin pack.

The nanofiber layer sample was then removed from the scrim, and subjected to cross-linking as described in Example 11.

Example 13

Layers of nanofibers were made by electroblowing the solution at the same conditions as in Example 11, with the exceptions that the applied voltage was 75 kV and the line speed was 0.3 m/min. The nanofiber layer sample was laid onto a scrim (a 30 g/m² PET spunbond fabric available from Kolon Industries, Inc., Korea) positioned on the porous belt in two passes of the moving collection belt beneath the spin pack.

The nanofiber layer sample was then removed from the scrim, and subjected to cross-linking as described in Example 11.

Example 14

A layer of nanofibers was made by electroblowing the solution as described in Example 11 with the following exceptions. The temperature of the solution in the pack was 62° C. with the pressure of the solution in the spinning nozzles at 3.4 bar. The spinneret was electrically insulated and applied with a voltage of 70 kV. Compressed air at a temperature of 92° C. was injected through the gas injection nozzles from the spin pack at a rate of 700 L/min. The fibers were laid down 450 mm below the exit of the pack onto a porous belt moving at 1.3 m/min. The nanofiber layer sample was laid onto a scrim (a 30 g/m² PET spunbond fabric available from Kolon Industries, Inc., Korea) positioned on the porous belt in a single pass of the moving collection belt beneath the spin pack.

The nanofiber layer sample was then removed from the scrim, and subjected to cross-linking as described in Example 11, with the exception that a 8 inch by 14 inch sample was immersed in the reaction liquid for 10 min. This is listed in Table 3 as Example 14.

TABLE 3

| Ex. | Thickness mil (mm) | Basis Weight g/m² | Fiber Dia. nm | Frazier Air Permeability cfm/ft² (m³/min/m²) | Gurley Hill Porosity sec | MD Tensile Strength kg$_f$/cm² | Mean Flow Pore Size µm | Porosity % | Ionic Resistance** milliohm-cm² | MacMullin No. |
|---|---|---|---|---|---|---|---|---|---|---|
| 11 | 0.8 (0.020) | 12.4 | 395 | 0.659 (0.201) | 4.70 | 228 | 0.49 | 46.5 | 21 | 4.7 |
| 12 | 1.2 (0.030) | 17.9 | 334 | 0.425 (0.130) | 7.30 | 210 | 0.48 | 48.5 | 34 | 5.1 |
| 13 | 1.4 (0.036) | 21.1 | 295 | 0.352 (0.107) | 8.80 | 204 | 0.44 | 48.0 | 46 | 5.9 |
| 14 | 1.27 (0.032) | 8.40 | 2150 | 107 (32.6) | 0.029 | | | 77.2 | 26.8 | 3.8 |

**as measured in 40% KOH electrolyte solution.

As can be seen from Table 3, the crosslinked PVA samples of Examples 11–14 have a good balance of ionic resistance (MacMullin No.) and dendritic barrier (tensile strength). The small pore size of the separators will provide more resistance to dendritic growth. The separators offer very low resistance to the flow of ions.

What is claimed is:

1. A battery having a separator comprising a porous fine fiber layer of polymeric fibers having a mean diameter in the range from about 50 nm to about 3000 nm, wherein the porous fine fiber layer has a mean flow pore size of between about 0.01 µm and about 15 µm, a thickness of between about 0.1 mils (0.0025 mm) and about 12 mils (0.3 mm), a porosity of between about 20% and about 90%, a basis weight of between about 1 g/m² and about 90 g/m², a Frazier air permeability of less than about 150 cfm/ft² (46 m³/min/m²) and a MacMullin number of between about 2 and about 15.

2. The battery of claim 1 wherein the porous fine fiber layer has a Frazier air permeability of less than about 25 cfm/ft² (8 m³/min/m²).

3. The battery of claim 1 wherein the fibers comprise a polymer selected from the group consisting of aliphatic polyamide, semi-aromatic polyamide, polyvinyl alcohol, cellulose, polyethylene terephthalate, polypropylene terephthalate, polybutylene terephthalate, polysulfone, polyvinylidene fluoride, polyvinylidene fluoride-hexafluoropropene, polymethyl pentene, polyacrylonitrile, polymethyl methacrylate, polyphenylene sulfide, polyacetyl, polyurethane, aromatic polyamide and blends, mixtures and copolymers thereof.

4. The battery of claim 1 wherein the porous fine fiber layer has a mean flow pore size of between about 0.01 µm and about 5 µm.

5. The battery of claim 1 wherein the porous fine fiber layer has a thickness of between about 0.5 mil (0.0127 mm) and about 5 mil (0.127 mm).

6. The battery of claim 1 wherein the porous fine fiber layer has a basis weight of between about 5 g/m² and about 30 g/m².

7. The battery of claim 1 wherein the fibers have a mean diameter between about 50 nm and about 1000 nm.

8. The battery of claim 3 wherein the polymer is crosslinked.

9. The battery of claim 1 wherein the porous fine fiber layer has an ionic resistance of between about 10 milliohms-cm² and about 60 milliohms-cm² in 40% potassium hydroxide electrolyte solution.

10. The battery of claim 1 wherein the porous fine fiber layer has an ionic resistance of between about 1 ohms-cm² and about 5 ohms-cm² in 0.5 molar lithium trifluoromethanesulfonate (LiTFS), propylene carbonate:ethylene carbonate:dimethoxyethane (22:8:70) electrolyte solution.

11. The battery of claim 1 wherein the separator comprises multiple porous fine fiber layers.

12. The battery of claim 11 wherein the separator comprises multiple porous fine fiber layers comprising differing polymers.

13. The battery of claim 11 wherein the separator comprises multiple porous fine fiber layers having differing characteristics selected from the list consisting of thickness, basis weight, pore size, fiber size, porosity, air permeability, ionic resistance and tensile strength.

14. The battery of claim 1 which is an alkaline battery.

15. The alkaline battery of claim 14 wherein the battery separator has an ionic resistance of less than about 100 milliohms-cm² in 40% potassium hydroxide electrolyte solution.

16. The alkaline battery of claim 14 wherein the battery separator has a MacMullin number of between about 2 and about 6 and an ionic resistance of between about 10 milliohms-cm² and about 60 milliohms-cm² in 40% potassium hydroxide electrolyte solution.

17. The alkaline battery of claim 14 wherein the fibers are formed of a polymer selected from the list consisting of aliphatic polyamide, semi-aromatic polyamide, polyvinyl alcohol, cellulose, polyethylene terephthalate, polypropylene terephthalate, polybutylene terephthalate, polysulfone, polyvinylidene fluoride, polymethyl pentene, polyphenylene sulfide, polyacetyl, polyurethane, aromatic polyamide and blends, mixtures and copolymers thereof.

18. The alkaline battery of claim 14 wherein the alkaline battery is a Zn—MnO$_2$ primary, Zn—MnO$_2$ secondary, Zn-Air, Zn—AgO, Ni—Zn, Cd-AgO, Zn—HgO, Cd—HgO Ni—Cd, Ni-Metal Hydride, or N$_1$—H$_2$ battery.

19. A lithium battery having a separator comprising a porous nanofiber layer of polymeric fibers having a mean diameter in the range from about 50 nm to about 1000 nm, wherein the nanofiber layer has a mean flow pore size of between about 0.01 µm and about 10 µm, a thickness of between about 0.1 mils (0.0025 mm) and about 5 mils (0.127 mm), a basis weight of between about 1 g/m² and about 30 g/m², a porosity of between about 20% and about 90%, a Frazier air permeability of less than about 50 cfm/ft² (15 m³/min/m²) and a MacMullin number of between about 2 and about 15.

20. The lithium battery of claim 19 wherein the battery separator has an ionic resistance of less than about 10 ohms-cm² in 0.5 molar lithium trifluoromethanesulfonate (LiTFS), propylene carbonate: ethylene carbonate: dimethoxyethane (22:8:70) electrolyte solution.

21. The lithium battery of claim 19 wherein the battery separator has a MacMullin number of between about 4 and about 10 and an ionic resistance of between about 1 ohms-cm$^2$ and about 5 ohms-cm$^2$ in 0.5 molar lithium trifluoromethanesulfonate (LiTFS), propylene carbonate:ethylene carbonate:dimethoxyethane (22:8:70) electrolyte solution.

22. The lithium battery of claim 19 wherein the fibers are formed of a polymer selected from the list consisting of aliphatic polyamide, semi-aromatic polyamide, polyacrylonitrile, polyvinyl alcohol, polypropylene, polyethylene, polyethylene terephthalate, polybutylene terephthalate, polypropylene terephthalate, polysulfone, polyvinylidene fluoride, polyvinylidene fluoride-hexafluoropropene, polymethyl pentene, polyphenylene sulfide, polytetrafluoroethylene, ethylene tetrafluoroethylene, polyacetyl, polyurethane, aromatic polyamide and blends, mixtures and copolymers thereof.

23. The lithium battery of claim 19 wherein the lithium battery is a lithium primary, lithium ion secondary or lithium ion gel polymer battery.

24. The lithium battery of claim 19 wherein the lithium battery is a Li—MnO$_2$ or Li—FeS$_2$ lithium primary battery.

25. The lithium battery of claim 22 wherein the polymer is crosslinked.

\* \* \* \* \*